United States Patent [19]

Hoffmann et al.

[11] 3,880,958
[45] Apr. 29, 1975

[54] N-(N'SUBSTITUTED-AMINOMETHYLIDENE)-O,S-DIALKYLTHIOL-PHOSPHORIC ACID DIESTER-IMIDES

[75] Inventors: Hellmut Hoffmann, Wuppertal; Ingeborg Hammann, Cologne, both of Germany

[73] Assignee: Bayer Aktiengesellschaft, Leverkusen, Germany

[22] Filed: Mar. 5, 1973

[21] Appl. No.: 338,010

[30] Foreign Application Priority Data
Mar. 9, 1972 Germany............................. 2211338

[52] U.S. Cl. ................. 260/944; 260/950; 260/968; 424/200; 424/211; 424/220
[51] Int. Cl............................. C07f 9/24; A01n 9/36
[58] Field of Search....................................... 260/944

[56] References Cited
UNITED STATES PATENTS
3,281,321  10/1966  Malz et al........................... 260/944
3,801,679  4/1974  Hoffmann et al.................... 260/945

*Primary Examiner*—Anton H. Sutto
*Attorney, Agent, or Firm*—Burgess, Dinklage & Sprung

[57] ABSTRACT

N-(N'-substituted-aminomethylidene)-O,S-dialkylthiolphosphoric acid diester-imides of the formula

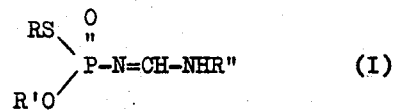

in which
R and R' each independently is lower alkyl, and
R'' is alkyl or alkenyl with up to 6 carbon atoms, cycloalkyl with 4 to 6 carbon atoms or a nitrogen-containing heterocyclic structure,
which possess insecticidal and acaricidal properties.

7 Claims, No Drawings

N-(N'SUBSTITUTED-AMINOMETHYLIDENE)-O,S-DIALKYLTHIOL-PHOSPHORIC ACID DIESTER-IMIDES

The present invention relates to and has for its objects the provision of particular new N-(N'-substitutedaminomethylidene)-O,S-dialkylthiol-phosphoric acid diester-imides which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Published Specification DOS 2,014,027 that O,S-dialkyl-N-acetyl-thiolphosphoric acid ester amides, for example O-methyl- (Compound A) or O-ethyl-S-methyl-N-acetyl-thiophosphoric acid ester amide (Compound B), possess insecticidal and acaricidal properties.

The present invention provides N-(aminomethylidene)-thiol-phosphoric acid ester imides of the general formula

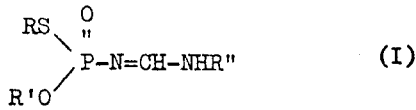

in which
R and R' each independently is lower alkyl, and
R'' is alkyl or alkenyl with up to 6 carbon atoms, cycloalkyl with 4 to 6 carbon atoms or a nitrogen-containing heterocyclic structure.

Preferably R and R' represent straight-chain or branched alkyl with 1 to 4, especially 1 to 3 carbon atoms, and R'' represents straight-chain or branched lower alkyl with 1 to 4 carbon atoms, alkenyl with 3 or 4 carbon atoms, cyclohexyl or the pyridine radical.

Surprisingly, the N-(aminomethylidene)-thiol-phosphoric acid ester imides according to the invention possess a substantially better insecticidal and acaricidal action than the previously known O,S-dialkyl-N-acetyl-thiol phosphoric acid ester amides of analogous structure and same type of action. The substances according to the invention thus represent a genuine enrichment of the art.

The invention also provides a process for the production of a N-(amino-methylidene)-thiol-phosphoric acid ester imide of the formula (I) in which a phosphorylated iminoformic acid alkyl ester of the general formula

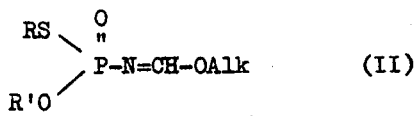

in which
R and R' have the abovementioned meanings and Alk is $C_{1-6}$ alkyl, preferably $C_{1-3}$ alkyl, is reacted with an amine of the general formula $$NH_2R''$$ (III)

in which
R'' has the abovementioned meaning.

If N-(O,S-dimethylthiol-phosphoryl)-iminoformic acid ethyl ester and isopropylamine are used as the starting substances, the course of the reaction can be represented by the following formula scheme:

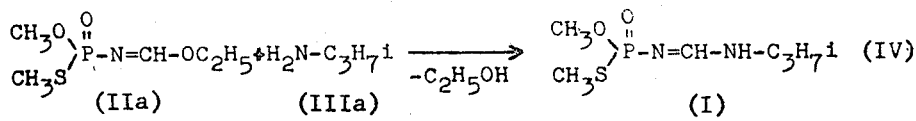

The following may be mentioned as examples of amines of formula (III): methylamine, ethylamine, n-propylamine, isopropylamine, n-butylamine, sec.-, tert.- and iso-butylamine, allylamine, butenylamine, cyclohexylamine and 2-aminopyridine.

The phosphorylated iminoformic acid alkyl esters of formula (II) are new and may be prepared in accordance with a new process from the O,S-dialkyl-thiolphosphoric acid ester amides known from the literature, viz, U.S. Pat. No. 3,309,266, and orthoformic acid alkyl esters. Their preparation is the subject of Application Ser. No. 240,282, filed Mar. 31, 1972, now pending. As examples of phosphorylated iminoformic acid alkyl esters of formula (II) there may be mentioned: N-(O,S-dimethyl- and N-(O,S-diethyl- and N-(O,S-dipropylthiolphosphoryl)-iminoformic acid ethyl esters.

The process according to the invention can be carried out in the presence or absence of solvents or diluents. As such, practically all inert organic solvents can be used. These include above all aliphatic and aromatic optionally chlorinated hydrocarbons, such as benzene, toluene, xylene, benzine, chlorobenzene, methylene chloride, chloroform or carbon tetrachloride; ethers, such as diethyl ether, dibutyl ether or dioxane; ketones, for example acetone, methyl ethyl ketone, methyl isopropyl ketone or methyl isobutyl ketone; and nitriles, sich as acetonitrile or propionitrile.

The reaction temperature can be varied over a wide range. In general the reaction is carried out at about 0 to 100°C, preferably about 10° to 25°C.

The reaction is generally carried out at normal pressure.

In carrying out the process, the components may be brought together, with stirring, in the presence or absence of one of the above-mentioned solvents or diluents; thereafter the mixture may be stirred for several hours at the indicated temperatures and subsequently the easily volatile constituents, such as solvents, which may still be present, may be distilled off.

The substances according to the invention are in most cases obtained in the form of colorless to slightly colored oils which cannot be distilled without decomposition but can be freed of the last volatile constituents, and in this way purified, by so-called "slight distillation," that is prolonged heating under reduced pressure to a moderately elevated temperature. The refractive index is especially useful for their characterization. If they are obtained in a crystalline form, they are characterized by the melting point.

As has already been mentioned, the new N-(aminomethylidene)-thiol-phosphoric acid ester imides are distinguished by excellent insecticidal and acaricidal activity towards plant pests. Herein, they possess a good action both against sucking and against biting insects and mites (Acarina), coupled with low phytotoxicity.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorchoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry bettle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain bettle (*Oryzaephilus surinamensis*), and also species living in the soil, for example wireworms (*Agriotes* spec.) and larvae of the cockchafer (*Melolontha melolontha*); cockroaches, such as the German cockroach (*Blattella germanica*), American cockroach (*Periplaneta americana*), Madeira cockroach (*Leuocophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (*Acari*) there are classed, in particular, the spider mites (Tetranychidae) such as the two-spotted spider mite (*Tetranychus urticae*) and the European red mite (*Paratetranychus pilosus = Panonychus ulmi*), gall mites, for examples the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.) cycloalkanes (e.g. cyclohexane, etc.) paraffins (e.g. petroleum or mineral oil fractions), chlorinated aliphatic hydrocarbons (e.g. methylene chloride, chloroethylenes, etc.) alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Phaedon larvae test
Solvent: 3 parts by weight of acetone
Emulsifier: 1 part by weight of alkylaryl polyglycol ether To manufacture an appropriate preparation of active compound, 1 part by weight of active compound was mixed with the indicated amount of solvent which contained the indicated amount of emulsifier, and the concentrate was diluted with water to the desired concentration.

Cabbage leaves (*Brassica oleracea*) were sprayed with the preparation of the active compound until dripping wet and were then infested with mustard beetle larvae (*Phaedon cochleariae*).

After the indicated times, the degree of destruction was determined as a percentage. 100% means that all beetle larvae were killed. 0% means that no beetle larvae were killed.

The active compounds, the concentrations of the active compounds, the times of evaluation and the results can be seen from the following Table 1.

Table 1

(Insects harmful to plants)

Phaedon larvae test

| Active compounds | Active compound concentration in % by weight | Degree of destruction in % after 3 days |
| --- | --- | --- |
| 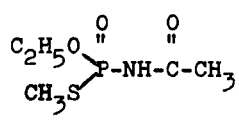 | 0.1<br>0.01 | 90<br>0 |

Table 1 —Continued (Insects harmful to plants)

Phaedon larvae test

| Active compounds | Active compound concentration in % by weight | Degree of destruction in % after 3 days |
|---|---|---|
| (known) (B) $\begin{matrix}CH_3O\\CH_3S\end{matrix}\!\!>\!\!P\!-\!N\!=\!CH\!-\!NH\!-\!C_3H_7\text{-}n$ (7) | 0.1<br>0.01 | 100<br>50 |
| $\begin{matrix}CH_3O\\CH_3S\end{matrix}\!\!>\!\!P\!-\!N\!=\!CH\!-\!NH\!-\!CH(CH_3)_2$ (1) | 0.1<br>0.01 | 100<br>100 |
| $\begin{matrix}CH_3O\\CH_3S\end{matrix}\!\!>\!\!P\!-\!N\!=\!CH\!-\!NH\!-\!CH_2\!-\!CH(CH_3)_2$ (5) | 0.1<br>0.01 | 100<br>90 |
| $\begin{matrix}CH_3O\\CH_3S\end{matrix}\!\!>\!\!P\!-\!N\!=\!CH\!-\!NH\!-\!C(CH_3)_3$ (2) | 0.1<br>0.01 | 100<br>100 |
| $\begin{matrix}CH_3O\\CH_3S\end{matrix}\!\!>\!\!P\!-\!N\!=\!CH\!-\!NH\!-\!\langle H \rangle$ (4) | 0.1<br>0.01 | 100<br>50 |

EXAMPLE 2

Myzus test (contact action)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which has been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 2.

Table 2

(Insects harmful to plants)

Myzus test

| Active compounds | Active compound concentration in % by weight | Degree of destruction in % after 1 day. |
|---|---|---|
| 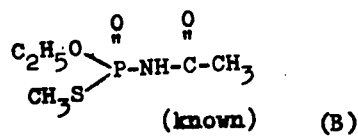<br>(known) (B) | 0.01<br>0.001 | 20<br>0 |
| 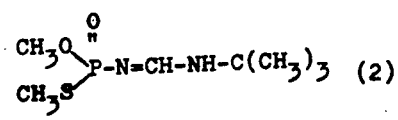 (2) | 0.01<br>0.001 | 100<br>35 |

EXAMPLE 3

Rhopalosiphum test (systemic action)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Oat plants (*Avena sativa*) which had been strongly infested with the bird cherry aphid (*Rhopalosiphum padi*) were watered with the preparation of the active compound so that the preparation penetrated into the soil without wetting the leaves of the oat plants. The active compound was taken up by the oat plants from the soil and thus reached the infested leaves.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 3.

EXAMPLE 4

Tetranychus test (resistant)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate so obtained was diluted with water to the desired concentration.

Bean plants (*Phaseolus vulgaris*), which had a height of approximately 10–30 cm, were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained is expressed as a percentage: 100% means that all the spider mites were killed whereas 0% means that none of the spider mites were killed.

Table 3

(Insects harmful to plants)

Rhopalosiphum test (systemic action)

| Active compounds | Active compound concentration in % by weight | Degree of destruction in % after 4 days |
|---|---|---|
| 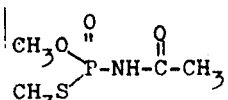 (known) (A) | 0.01<br>0.001 | 100<br>0 |
| 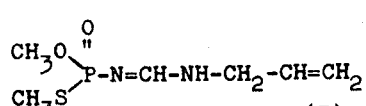 (3) | 0.01<br>0.001 | 100<br>85 |
| 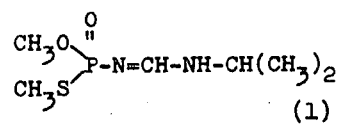 (1) | 0.01<br>0.001 | 100<br>100 |
| 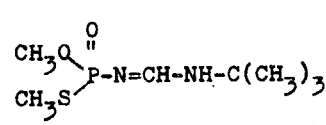 (2) | 0.01<br>0.001 | 100<br>80 |
| 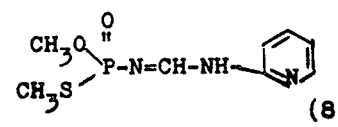 (8) | 0.01<br>0.001 | 100<br>70 |

The active compounds, the concentrations of the active compounds, the evaluation times and the results can be seen from the following Table 4.

Table 4

(Mites harmful to plants)

Tetranychus test / resistant

| Active compounds | Active compound concentration in % by weight | Degree of destruction in % after 2 days. |
| --- | --- | --- |
| $\begin{array}{c}CH_3O\\CH_3S\end{array}\!\!\!\diagdown\!\!\!P(=O)\text{-NH-C(=O)-}CH_3$ (known) (A) | 0.1 | 0 |
| $\begin{array}{c}C_2H_5O\\CH_3S\end{array}\!\!\!\diagdown\!\!\!P(=O)\text{-NH-C(=O)-}CH_3$ (known) (B) | 0.1 | 20 |
| $\begin{array}{c}CH_3O\\CH_3S\end{array}\!\!\!\diagdown\!\!\!P(=O)\text{-N=CH-NH-}CH_2\text{-CH=}CH_2$ (3) | 0.1 | 95 |
| $\begin{array}{c}CH_3O\\CH_3S\end{array}\!\!\!\diagdown\!\!\!P(=O)\text{-N=CH-NH-}CH_3$ (6) | 0.1 | 98 |
| $\begin{array}{c}CH_3O\\CH_3S\end{array}\!\!\!\diagdown\!\!\!P(=O)\text{-N=CH-NH-}C_3H_7\text{-n}$ (7) | 0.1 | 90 |
| $\begin{array}{c}CH_3O\\CH_3S\end{array}\!\!\!\diagdown\!\!\!P(=O)\text{-N=CH-NH-CH(}CH_3)_2$ (1) | 0.1 | 95 |
| $\begin{array}{c}CH_3O\\CH_3S\end{array}\!\!\!\diagdown\!\!\!P(=O)\text{-N=CH-NH-}CH_2\text{-CH(}CH_3)_2$ (5) | 0.1 | 95 |
| $\begin{array}{c}CH_3O\\CH_3S\end{array}\!\!\!\diagdown\!\!\!P(=O)\text{-N=CH-NH-C(}CH_3)_3$ (2) | 0.1<br>0.01 | 99<br>40 |

The process of this invention is illustrated by the following preparative examples.

EXAMPLE 5 a. The N-(O,S-dimethylthiolphosphoryl)-iminoformic acid ester used as the starting compound was prepared as follows:

71 g (0.5 mole) of O,S-dimethylthiol-phosphoric acid ester amide and 92 g of orthoformic acid ethyl ester were heated to the boil under reflux for 4 hours. Thereafter the alcohol formed was distilled off and the residue was distilled. 56 g (57% of theory) of the desired N-(O,S-dimethylthiolphosphoryl)-iminoformic acid ethyl ester of boiling point 84°C/0.01 mm Hg and refractive index $n_c^{22} = 1.4892$ were obtained.

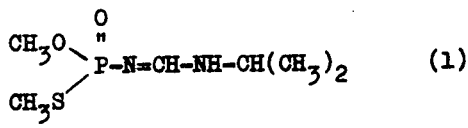

14 g (0.2 mole) of isopropylamine in 50 ml of benzene were added dropwise to 40 g (0.2 mole) of N-

(O,S-dimethylthiol-phosphoryl)-iminoformic acid ethyl ester dissolved in 100 ml of benzene while cooling - the temperature being kept at 10° to 15°C — and stirring. Thereafter the mixture was stirred for 2 hours while cooling, the solvent was distilled off in vacuo and the residue was subjected to "slight distillation." 35 g (83% of theory) of N-(N'-isopropylaminomethylidene)-O,S-dimethylthiolphosphoric acid diester-imide of refractive index $n_D^{24} =$ 1.5161 were obtained.

The following compounds were prepared analogously:

| Structure | Physical properties (refractive index, melting point) |
|---|---|
| $\begin{array}{c}CH_3O\\CH_3S\end{array}\!\!\!\!\!\diagdown\!\!\overset{O}{\underset{\|}{P}}\!\!-N=CH-NH-C(CH_3)_3$ (2) | $n_D^{26} = 1.5129$ |
| $\begin{array}{c}CH_3O\\CH_3S\end{array}\!\!\!\!\!\diagdown\!\!\overset{O}{\underset{\|}{P}}\!\!-N=CH-NH-CH_2-CH=CH_2$ (3) | $n_D^{26} = 1.5341$ |
| $\begin{array}{c}CH_3O\\CH_3S\end{array}\!\!\!\!\!\diagdown\!\!\overset{O}{\underset{\|}{P}}\!\!-N=CH-NH-\langle H\rangle$ (4) | $n_D^{23} = 1.5336$ |
| $\begin{array}{c}CH_3O\\CH_3S\end{array}\!\!\!\!\!\diagdown\!\!\overset{O}{\underset{\|}{P}}\!\!-N=CH-NH-CH_2-CH(CH_3)_2$ (5) | $n_D^{23} = 1.5141$ |
| $\begin{array}{c}CH_3O\\CH_3S\end{array}\!\!\!\!\!\diagdown\!\!\overset{O}{\underset{\|}{P}}\!\!-N=CH-NH-CH_3$ (6) | $n_D^{25} = 1.5322$ |
| $\begin{array}{c}CH_3O\\CH_3S\end{array}\!\!\!\!\!\diagdown\!\!\overset{O}{\underset{\|}{P}}\!\!-N=CH-NH-C_3H_7\,n$ (7) | $n_D^{28} = 1.5167$ |
| $\begin{array}{c}CH_3O\\CH_3S\end{array}\!\!\!\!\!\diagdown\!\!\overset{O}{\underset{\|}{P}}\!\!-N=CH-NH-\langle N\rangle$ (8) | Melting point 118–122°C |

It will be appreciated that the instant specification and examples are set forth by way of illustration and not limitation, and that various modifications and changes may be made without departing from the spirit and scope of the present invention.

What is claimed is:

1. A N-(aminomethylidene)-thiol-phosphoric acid ester imide of the formula $$\begin{array}{c}R-S\\R'-O\end{array}\!\!\!\!\!\diagdown\!\!\overset{O}{\underset{\|}{P}}\!\!-N=CH-NHR''$$

in which

R and R' each independently is lower alkyl, and

R'' is alkyl or alkenyl with up to 6 carbon atoms, cycloalkyl with 4 to 6 carbon atoms.

2. A compound according to claim 1 in which R and R' each is alkyl with 1 to 3 carbon atoms, and R'' is alkyl with 1 to 4 carbon atoms, alkenyl with 3 or 4 carbon atoms, or cyclohexyl.

3. The compound according to claim 1 wherein such compound is N-(N'-iso-propyl-aminomethylidene)-O,S-dimethylthiolphosphoric acid diester imide of the formula

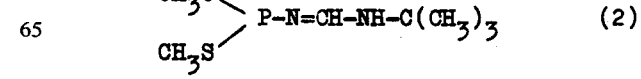

4. The compound according to claim 1 wherein such compound is N-(N'-tert-butyl-aminomethylidene) - O,S-dimethylthiolphosphoric acid diester imide of the formula

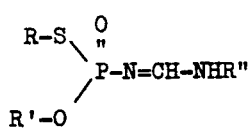

5. The compound according to claim 1 wherein such compound N-(N'-iso-butylaminomethylidene)O,S-dimethylthiol-phosphoric acid diester imide of the formula

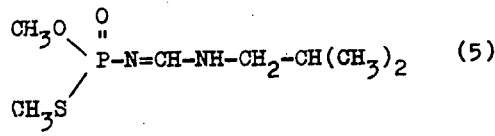

6. The compound according to claim 1 wherein such compound is N-(N'-methylaminomethylidene) - O,S-dimethylthiol-phosphoric acid diester imide of the formula

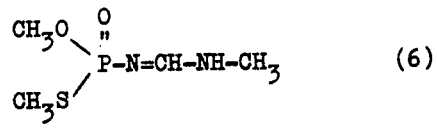

7. The compound according to claim 1 wherein such compound is N-(N'-n-propylaminomethylidene) - O,S-dimethylthiol-phosphoric acid diester imide of the formula

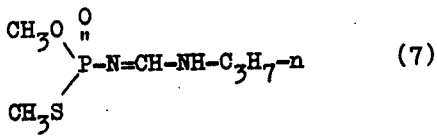

* * * * *